United States Patent
Woodward

(10) Patent No.: US 11,940,903 B2
(45) Date of Patent: *Mar. 26, 2024

(54) TESTING SYSTEMS AND METHODS

(71) Applicant: KING.COM LIMITED, St. Julians (MT)

(72) Inventor: Simon Woodward, Barcelona (ES)

(73) Assignee: KING.COM LIMITED, St. Julians (MT)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,786

(22) Filed: Oct. 7, 2022

(65) Prior Publication Data
US 2023/0036089 A1 Feb. 2, 2023

Related U.S. Application Data

(63) Continuation of application No. 14/546,248, filed on Nov. 18, 2014, now Pat. No. 11,494,293.

(51) Int. Cl.
*G06F 9/44* (2018.01)
*G06F 11/36* (2006.01)

(52) U.S. Cl.
CPC ...... *G06F 11/3688* (2013.01); *G06F 11/3664* (2013.01); *G06F 11/368* (2013.01)

(58) Field of Classification Search
CPC . G06F 11/3664; G06F 11/3688; G06F 11/368
See application file for complete search history.

(56) References Cited

U.S. PATENT DOCUMENTS

| | | |
|---|---|---|
| 8,209,549 B1 | 6/2012 | Bain |
| 2011/0231821 A1 | 9/2011 | Sahni et al. |
| 2013/0030868 A1 | 1/2013 | Lyon et al. |
| 2013/0031228 A1 | 1/2013 | Lyon et al. |
| 2013/0246334 A1 | 9/2013 | Ahuja et al. |
| 2014/0082593 A1 | 3/2014 | Alper et al. |
| 2014/0095933 A1 | 4/2014 | Griesinger et al. |
| 2014/0109066 A1 | 4/2014 | Dhanda et al. |
| 2014/0310691 A1 | 10/2014 | Ou |
| 2014/0329585 A1 | 11/2014 | Santini et al. |

FOREIGN PATENT DOCUMENTS

WO  WO 2014/161970 A1  10/2014

OTHER PUBLICATIONS

Kohavi, et al., "Controlled experiments on the web: survey and practical guide", Data Mining and Knowledge Discovery, Lkuwer Academis Publishers, BO, vol. 18, No. 1 XP019641021, Jul. 30, 2008, pp. 140-181.

*Primary Examiner* — Chat C Do
*Assistant Examiner* — Lenin Paulino
(74) *Attorney, Agent, or Firm* — Saul Ewing LLP

(57) ABSTRACT

A computer implemented method, system and computing device for identifying a test option associated with an application for a user is described. The method comprises selecting a predefined test indicated by a test identifier associated with the requested application, the test having more than one test option associated therewith, generating a hash of the test identifier and a user identifier associated with the user, processing the hash to generate an index, comparing said index with a distribution of numbers divided into multiple ranges, each range being associated with a test option, and selecting a test option associated with the range into which the index falls. The applications may be computer gaming applications.

16 Claims, 7 Drawing Sheets

Figure 4

| Testname1 | | | |
|---|---|---|---|
| Option | Probability | Range | Designation group |
| 1 | 10% | 0-9 | Control |
| 2 | 20% | 10-29 | A |
| 3 | 20% | 30-49 | B |
| 4 | 50% | 50-99 | C |

TESTING SYSTEMS AND METHODS

CROSS-REFERENCE TO RELATED APPLICATIONS

This application is a continuation of U.S. application Ser. No. 14/546,248, filed on Nov. 18, 2014, the entire contents of which being fully incorporated herein by reference.

FIELD OF THE INVENTION

The present invention relates to testing of computer executable applications.

BACKGROUND

The advent of the internet, and other wide area networks, has led to a proliferation of connected user or client devices, typically running services and associated installations from providers of the user's choice. Such installations may be gaming related. Providers of such gaming services such as King.com™ are popular, and may have in excess of 300 million customers with associated data.

Updates and new offerings or services are common within such an environment. These updates, offerings or services are provided to users by awarding applications provided to the users with different options. The service provider may wish to try out, sample or test these options to understand which offerings are more popular or taken up with positive feedback from the user population before general release. Such a form of testing comprises so-called "AB Testing" where two groups of customers or users are associated with offerings of option A or option B. A third group may form a control group. Information about what user has been assigned to which group is typically held in a database and possibly at a separate server.

When a user logs on to access the service, in order to ascertain which modification to deliver, the service provider must also ascertain whether that user already belongs to a group, and if so, what group the user belongs to. This can require a call to another server which holds this information, and even if not to another server, the call requires a query to be run over potentially vast amounts of data before the proper option can be returned to the user.

In the context of large customer databases, and associated data such calls and queries can be resource depleting and time consuming.

SUMMARY OF THE INVENTION

According to a first aspect, there is provided a computer system for testing different options for modifying a computer executable application delivered to a population of users, the system comprising an application server, and a user device associated with a user of the population and configured to communicate with the application server and to access applications from the server, the server having storage for storing applications for access and at least one test identifier identifying a test for the application, each test having multiple test options for modifying the application, the server having a processor configured to, in response to a received request from a user device for the application: select a test associated with the requested application, generate a hash of a user identifier associated with a user at the user device and the test identifier associated with the selected test, process the hash to generate an index value, compare said index value with a distribution of numbers divided into multiple ranges, each range being associated with a test option, select a test option associated with the range into which the index value falls, and transmit to the user device the application modified by the selected test option.

In an embodiment, the system comprises an event database which holds a data structure comprising at least one user identifier, application data defining the application, such as a game application identifier, version number and such, and associated event data for that user when executing the application modified by the selected test option.

In another embodiment, the generation of the hash comprises performing an MD5 hashing operation to provide an integer, for example, 128 bits in length.

An MD5 hash provides well distributed integers as a result, but other hashes may also be utilised with a similar effect.

In another embodiment, the processing of the hash to generate an index value comprises performing a modulus operation on said integer.

Advantageously, the modulus operation is a modulo (100) operation to provide an index value which is an integer falling within said distribution of numbers, where the distribution is 0 to 99. Other modulo operations may define other distributions, for example 0 to 9.

In yet another embodiment, the system comprises an analytics server in communication with the event database and configured to analyse the event data associated with the test options.

In a further embodiment, stored applications comprise computer games.

In another embodiment relating to the previous embodiment, the test options associated with the computer games modify the user interface (UI) of said computer games when delivered to the user device.

Optionally, the test options comprise an AB test. In such an embodiment, each application has two or more test options which represent variants of the same feature (e.g. UI feature) delivered to the user device. The test variants enable the service provider to review user behaviour in each test group to return an indication of the preferred variant of the feature.

An analyst wishing to analyse the results of the test once completed would typically have to look up per user which group or test option they were previously allocated to. There may be thousands of users which partook in a particular test or offer, and running such queries strains computing resources, is time consuming and inefficient and may require special access to the application server, therefore providing security and resource issues which the service provider must contend with.

In another aspect, there is provided a computer device for analysing event data associated with an application under test, the device comprising at least one processor and a database storing: a data structure storing at least one user identifier associated with a user, application data and event data for the user when executing the application modified by one of multiple test options, where in response to an analysis query comprising a user identifier, the at least one processor is configured to: request a test identifier and associated application event data associated with that user, generate a hash of the user identifier and the test identifier, process the hash to generate an index value, compare said index value with a distribution of numbers divided into multiple ranges to determine within which range the index value falls, select the test option associated with the range into which the index value falls, and associate the selected test option with the associated event data for analysis.

In yet another aspect, there is provided a computer implemented method for identifying a test option associated with an application executable at a user device of a user, the method comprising executing a program by a processor which performs the steps of: accessing from a data structure stored in electronic memory a predefined test indicated by a test identifier associated with the application, the test having more than one test option associated therewith, generating a hash of a user identifier associated with the user and the test identifier associated with the selected test, processing the hash to generate an index value, comparing said index value with a distribution of numbers divided into multiple ranges, each range being associated with a test option, and selecting a test option associated with the range into which the index value falls.

The method can be used at an analytics server or an application server: in each case the same test option is independently generated for a particular user and test.

In an embodiment of the above aspect, an application server modifies the application using the selected test option and delivers said modified application to said user.

In yet another embodiment, event data is generated by monitoring execution of the modified application at a user device with the selected test option.

In another embodiment, an analytics server associates event data from executing the modified application at a particular user device with a test option by generating the test option based on the user identifier and the test identifier.

In another aspect, there is provided a computing device for testing different options for modifying a computer executable application delivered to a population of users from a store for storing applications for access and at least one test identifier identifying a test for the application, each test having multiple test options for modifying the application, the computing device having a processor configured to, in response to a received request from a user device for the application: select a test associated with the requested application, generate a hash of a user identifier associated with a user at the user device and the test identifier, process the hash to generate an index value, compare said index value with a distribution of numbers divided into multiple ranges, each range being associated with a test option, select a test option associated with the range into which the index value falls, and transmit to the user device the application modified by the selected test option.

In yet another aspect, there is provided a computer program on a non-transitory computer-readable medium, which when executed by a processor of a computing device, causes said processor to access from a data structure stored in electronic memory a predefined test indicated by a test identifier associated with an application executable at a user device of a user, the test having more than one test option associated therewith, generate a hash of the test identifier and a user identifier associated with the user, process the hash to generate an index value, compare said index value with a distribution of numbers divided into multiple ranges, each range being associated with a test option, and select a test option associated with the range into which the index value falls.

In another aspect, there is provided a module for determining an index value indicating a test option in response to a provided user identifier and a test identifier by a computing device in communication therewith, the module being configured to generate a hash of the provided user identifier and test identifier, to process the hash to provide an index value, and to return said index value to said computing device.

In an embodiment of the above module aspect, the generation of the hash comprises performing an MD5 hashing operation to provide an integer.

In yet another embodiment, the module is further configured to perform a modulo operation on said integer to provide the index value.

The module may be realised in software, hardware or a combination of both depending on the particular application.

Other aspects and features are described with reference to the appended claims.

BRIEF DESCRIPTION OF DRAWINGS

To understand some embodiments, reference will now be made by way of example only to the accompanying drawings, in which:

FIG. 4 illustrates an example table of a number distribution for allocating test options;

DETAILED DESCRIPTION OF SOME EMBODIMENTS

In the following description, embodiments of a system and method are described which allow a test group to be readily identified without complex look ups, etc. being needed.

The component wishing to calculate the test group concatenates the user ID of the user making the request with the unique name of the test, forming a per-user-per-test identifier. Using this identifier rather than just the User ID ensures that the user will be placed into different groups for different tests. The component could be a server, but the same calculation can be done anywhere from the client, the server, the messaging systems and the analytical systems, and the test group can still be determined so long as the test name and the user ID are known.

The component then performs a hashing operation in accordance with e.g. the MD5 hashing protocol of the per-user-per-test identifier. Other hashing schemes may of course be utilized in accordance with the requirements of the service provider. The hashing operation HASH(UserID: testname1) results in a potentially very large integer (128 s bit in the case of MD5) which may be represented by a hexadecimal string.

The string or integer is submitted to a Modulus operation to reduce it to a decimal number of a more manageable size, generally a number between 0 and 99 using a Modulo(100) operation. The test administrator has previously divided the range of this number up, and assigned each sub-range to a test case. For example, 0-9 is assigned to test case A, and 10-99 is assigned to test case B.

Determining the sub-range containing the reduced hash returns the test case applicable to the requesting user for this test, and enables the component to provide the appropriate test experience to the user. For example, if the reduced hash is "8", then test case A is applicable to the user and the server will provide the corresponding experience.

Figure 1:
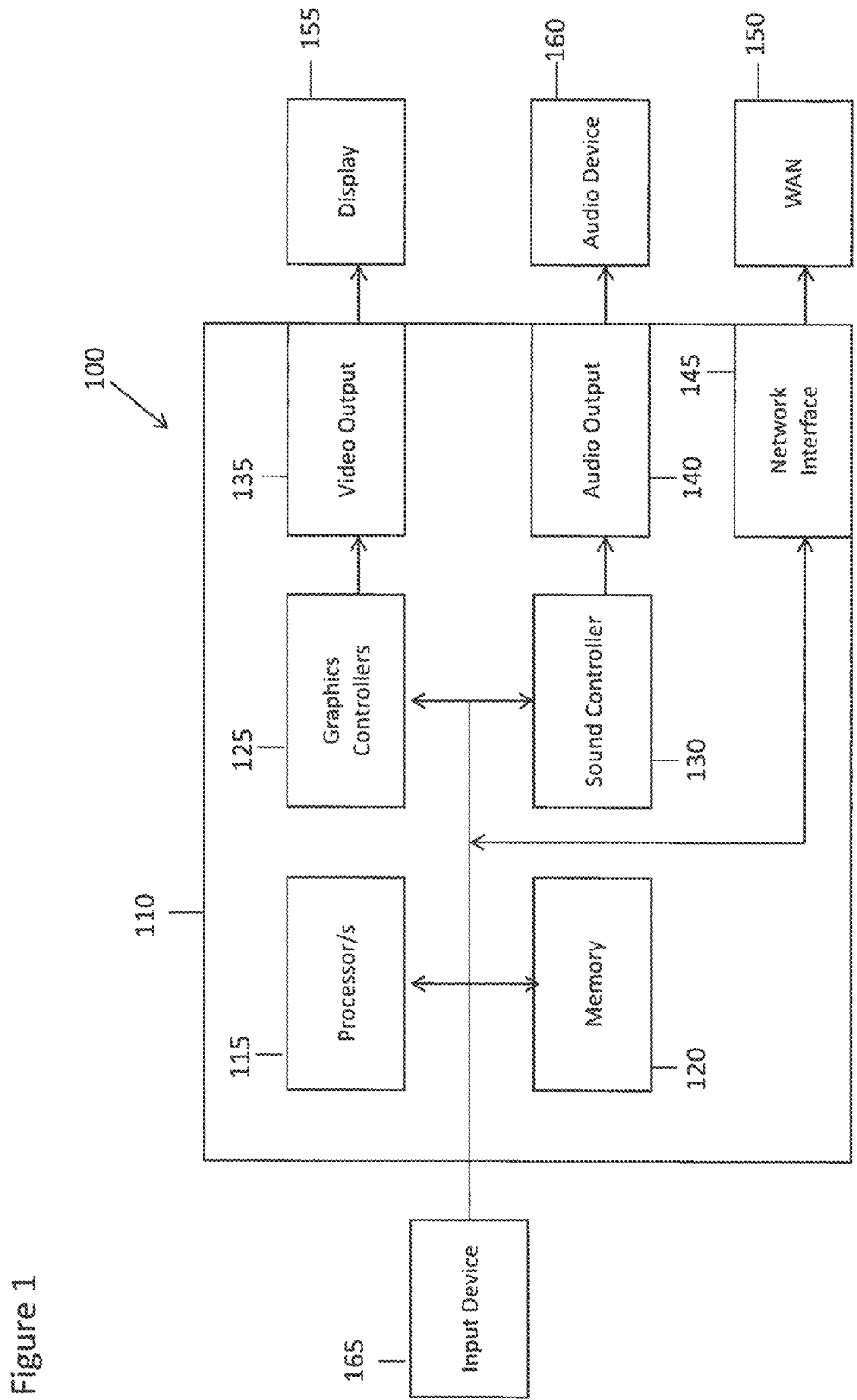
FIG. 1 shows an example client or user device.

A schematic view of a client or user device 100 according to an embodiment is shown in FIG. 1. All of the blocks shown are implemented by suitable circuitry. The blocks may be implemented in hardware and/or software. When implemented in software, this is achieved by executing a suitable program or code sequence by a processor 115. That program or code sequence can be stored in the memory 120 or downloaded in any known way. Therefore it is to be understood that other blocks shown in 100 by way of functional blocks could in fact be implemented by suitably executing programs in the processor 115. The user device 100 has a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
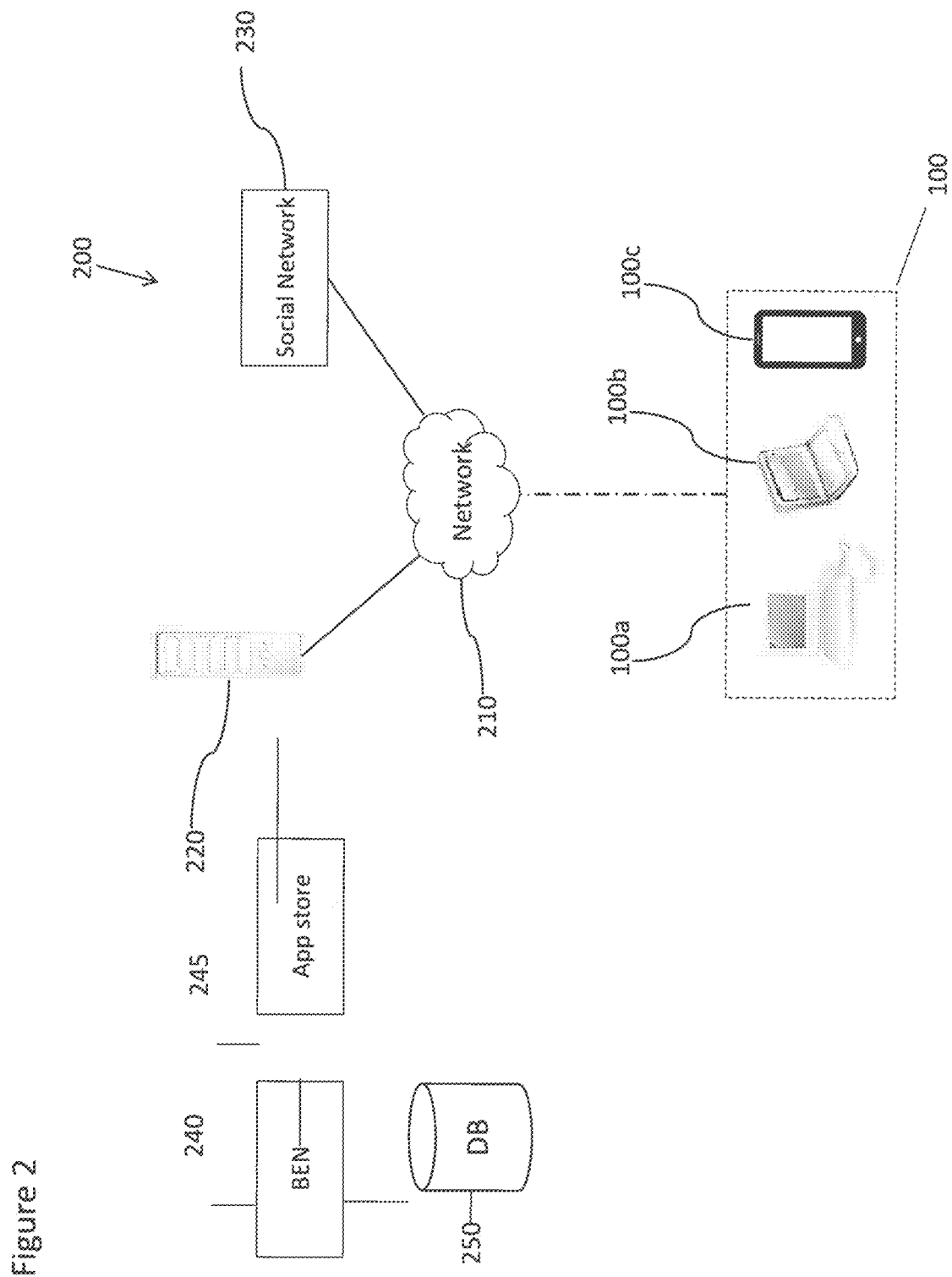
FIG. 2 illustrates a networked computer system.

FIG. 2 schematically shows a networked computer system 200. The system 200 comprises an application server 220 which delivers applications, for example games, to user devices 100 over a network 210. The application server comprises a back end infrastructure 240 "BEN" of game player's details, profiles, statistics, and other user associated data and history, and an application (for example game) store 245. The BEN 240 is connected to a database 250 which holds player data to support the back end infrastructure 240. The server 220 has a processor (not shown) which is responsive to requests from user devices to play games and to deliver appropriate games (in the form of computer executable applications) to a user.

The database 250 also stores user application event data to support analytics as will be described later.

The server 220 may communicate via for instance the internet 210 to one or more client or user devices 100, shown in the Figure by way of example as user devices 100a, 100b and 100c, and may further provide connections to a social network 230 such as Facebook™. User application, game or event data may be associated in some embodiments with the appropriate social network 230 user identifier.

For example, the application store 245 may store and provide for download or for online play of games such as the game of applicant "Candy Crush™".

This particular application has tens of millions of users worldwide, and a provider of such a game may wish to trial out or test new versions of the application, or test which offers and features are popular and which are not so popular before including these in a new release for example. Clearly, no provider wishes to include new features or offers that are not popular and risk alienating some of the users of that community.

Such offers may also include promotional events such as offering free game objects such as lives, boosters, new levels and so on.

The testing of such offers, events, promotions or new versions of an application may comprise so-called "AB Testing" where two groups of customers or users are associated with different, designated offers "A", group A, and offer "B", group B. Another group may typically form a control group, (C). "AB" testing can extend to multiple groups A, B, C, D and so on. Usually, an individual will be assigned a group randomly, wherein the testing typically follows strict statistical rules determining population division per grouping. An "offering" is in the form of a test option which modifies the application to present a different experience to a user in each group. For example, different variants of the same feature can be provided.

In the current systems, when a user logs on to access the service, the service provider must ascertain whether that user already belongs to a group, and if so, what group the user belongs to. This can require a call to another server which holds this information, and even if not to another server, the call requires a query to be run over potentially vast amounts of data before the proper option can be returned to the user.

This can be time consuming, and in particular for applications such as "Candy Crush™" entail the service provider running queries over vast amounts of data stored in the application store 245 or database 250 to find a user group or test option (or a previously allocated group and option) and associated events. Typically, such queries strain computing resources and require increased storage space and processing power.

Hence a problem exists in avoiding lookup when determining which option to deliver to a user partaking in the test.

Similarly, an analyst wishing to analyse the results of the test once completed would typically have to look up per user which group or test option they were previously allocated to. There may be thousands of users which partook in a particular test or offer, and running such queries similarly strains computing resources, is inefficient and may require special access to the application server, therefore providing security and resource issues which the service provider must contend with.

Embodiments will now be described with reference to FIGS. 3 to 7 which aim to improve upon the above situation.

Figure 3:
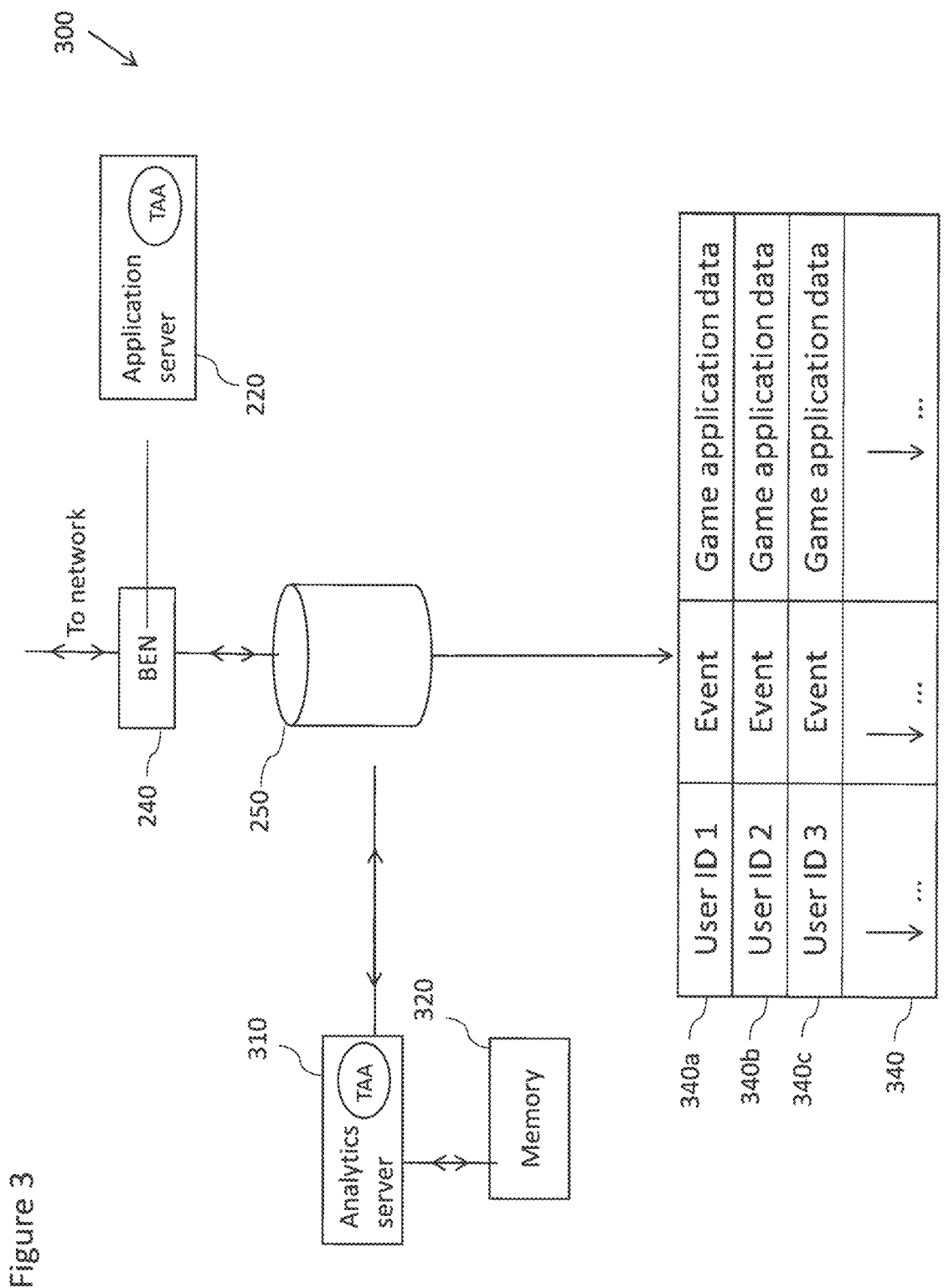
FIG. 3 shows an example computer system and data structure for holding event data.

FIG. 3 illustrates an embodiment of a system of FIG. 2. In addition to the application server 220, an analytics server 310 having a processor (not shown) and memory or storage 320 is also provided.

According to the underlying principles of the system architecture discussed herein, there is no centralised store which associates users with their allocated test options. Instead, the app server 220 and analytics server 310 each execute a test allocation algorithm (TAA) which generates test options for users on the fly.

However, the algorithm is the same, with the same result. In this way, identifying a test option to deliver to a user and determining which test option has been allocated for analysis are decoupled.

The analytics server 310 is typically accessible by statistical analysts or marketers for example, who may be contracted on behalf of the service provider to analyse the results of a test of an application having various offers or options as will be described later.

In this way, the database 250 stores player data 340 to support the back end infrastructure 240. Table 340 illustrates an example data structure which may be stored in tabular form, or associated record or array form as well known. In particular, the data structure 340 comprises associating a User ID with events in turn associated with game application data. Row 340*a* stores a first user identifier (User ID1) and event data associated with game application data relating to an application or game that the user plays or has downloaded or registered interest in for example. Row 340*b* stores a different user identifier (User ID2) with event data associated with the respective game application data, whilst row 340*c* stores a third user identifier (User ID3) with an event associated with game application data for applications that the third user is active in.

For example, if the application is the game Candy Crush™, the event data may reflect the user accepting an offer such as a new level, or giving feedback on the offering (such as a score or star rating of a new level that was tested), and the application data is the data associated with that event, e.g. acceptance of the offer, or the feedback rating.

Many other features, events and responses may be stored depending on the structure of the test and the number of options set by the service provider in a particular test as shall now be described with reference to FIG. 4.

FIG. 4 shows an example data structure 400 of a test that the service provider wishes to run on one of its applications, such as CandyCrush™. The test has an identifier 405 which in the figure for the sake of clarity is simply "Testname1". Of course, the test may be identified in various different ways such as numerically, or a tag, or simply a number depending on how the service provider defines such nomenclature.

Testname1 405 has, in this example four options 410 associated with it. For example, the service provider may wish to try out various offers of gift items within a game and deduce which offer/item is the most popular. For example option 1 450 may be the provision of extra lives to a user. Option2 460 may comprise the ability for the user to "gift" these lives to a friend together with an invite to that friend to play the game. Option3 470 may comprise a different "gift" offering in the form of the number of lives that can be gifted, whilst Option4 480 may comprise the ability to offer the gift to more than one friend.

Hence in this test 400, a number of users are needed to participate in option1 which is designated the Control group, whereas options 2, 3 and 4 are designated groups A, B, and C 440.

In this form of A/B testing the provider wishes to allocate the options randomly to users according to the probability distribution 420, i.e. 10% of the sample or population should be allocated in the control group (option 1), 20% of the sample or population should be allocated in group A (option 2), 20% of the sample or population should be allocated in group B (option 3), and 50% of the population should be allocated in group C (option 4).

As can be seen in FIG. 4, each option 410 is further provided with an associated number range 430. In this embodiment the range spans 0 to 99, and each option 410 is apportioned with a number range in proportion to the assigned probability 420. Hence, option 1 is associated with the range 0-9 in accordance with the 10% probability associated with the option, likewise option 2 is associated with the number range 10-29 in accordance with the 20% probability also associated with the option, option 3 is associated with the range 30-49 in accordance with the 20% probability also associated with the option, and option 4 is associated with the number range 50-99 in accordance with the 50% probability also associated therewith.

The use of this data structure will now be described with reference to FIG. 5.

Figure 5:
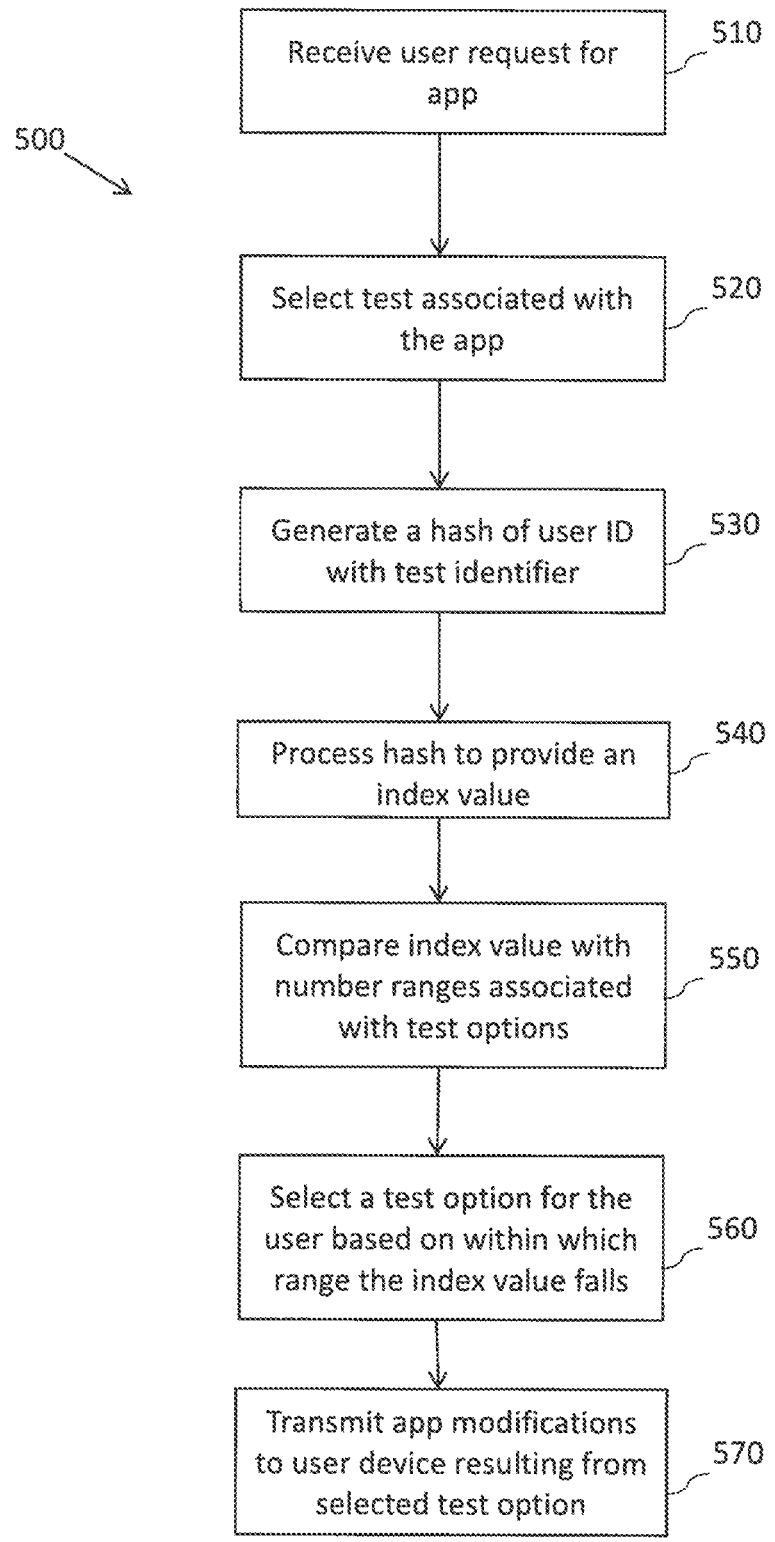
FIG. 5 is a diagram illustrating a flowchart of steps for allocating a test option.

FIG. 5 illustrates steps of an embodiment, performed by the TAA at application server 220 to allocate a test option 410 of a test 405 ("Testname1") to a user device 100.

At step 510 an electronic data message comprising a request for an application or associated offer is received by application server 220 and the user ID, which may be a login identity of the user or a device identifier, or some combinations of both, is stored 240, 250. Application server 220 subsequently, at step 520 selects a test 400 associated with the application from database 250, the test having an identifier, for example "Testname1" or some other suitable identifier.

At step 530 the server 220 performs a hashing operation of the user ID with the test identifier to provide a unique string of data which may be for example represented in hexadecimal form. Such hashing operations are well known. For example, in an embodiment the well-known "MD5" hashing operation may be performed.

At step 540 the hashed data is processed to provide an index value or number. Hence the combination of the userID1 with the Testname1 is suitably reduced to a number or index value in a predefined range 430.

Figure 6:
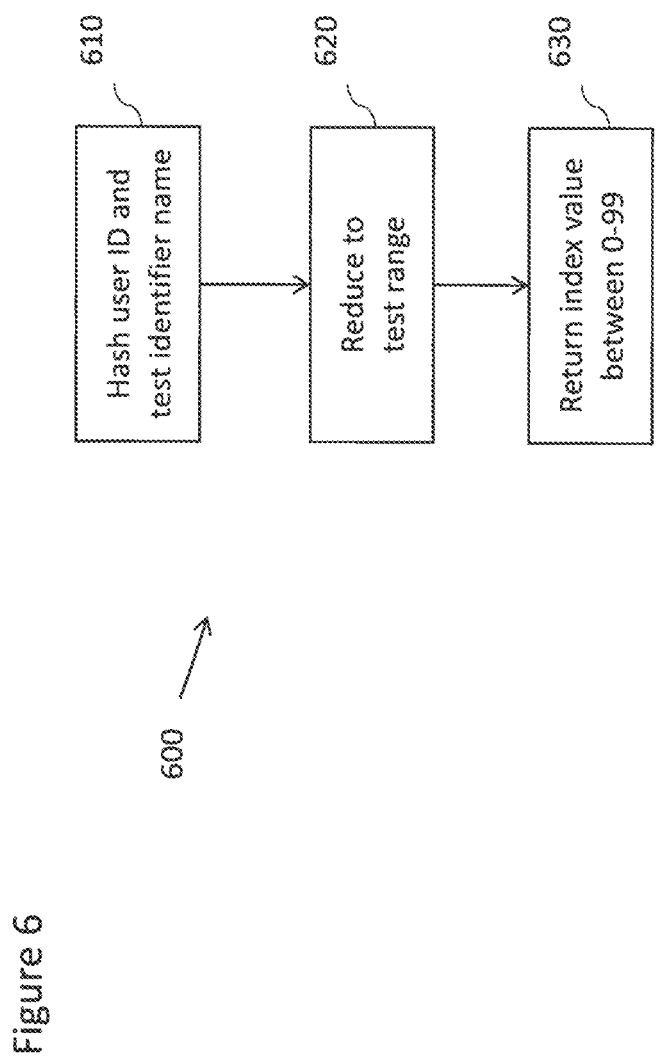
FIG. 6 illustrates steps of an embodiment for searching an index.

An example embodiment of the processing 600 of the hash is shown in FIG. 6, which will be described later.

The server 220 then proceeds to step 550 wherein the index value or number produced is compared with the data for that test 400 storing number ranges 430 associated with test options 410 and respective probabilities' 420.

The server 220, at step 560, selects a test option, and hence associated test group 440 based on the comparison. For example, if the hashing procedure and processing results in the number or index value "37", then, with reference to FIG. 4, option 3 is selected as 37 falls within the range 30-49 and corresponds to group B for that test. In other embodiments, for different desired probability distributions, the range may be varied.

That test option, including the encoded offer or gifts for example is then used to modify the application which is transmitted to the user device 100. Such modifications can be pre-stored in the database 250, for example whole levels of a game application in a suitable format.

Subsequently, but not shown in FIG. 5, any interaction by the user with the test option which has been incorporated in their version of the application which generates an event and associated game data is stored as shown and described with reference to FIG. 3. This data does not necessarily have to be associated with the particular test option at this stage. It is enough that it is associated with the user ID because the test option which was allocated can be determined by implementing the TAA at the analytics server 310.

FIG. 6 is an example embodiment of a method or algorithm for the processing of the hashed data (step 540) to provide an index value or number.

At step 610 the server 220 performs a hashing operation HASH ((UserID:test identifier) in accordance with the MD5 hashing protocol of the user ID making the request. Other hashing schemes may of course be utilized in accordance with the requirements of the service provider. The hashing operation is preferably chosen to convert the user ID: test identifier into a well distributed integer, for example, an MD5 hash. The well distributed integer which is produced is processed to reduce it down to a test range in any suitable way. In the present case it is done by submitting the string or integer at Step 620 to a Modulus or Modulo (100) operation to provide a decimal number or index value in this case between 0-99. However other ways are possible.

In one embodiment the last two digits of the result may be selected and the rest discarded to return an index value within the range of the desired population.

At step 630 the index value is returned.

Advantages of the above methods lie in efficiently allocating a user to a test group in a manner that is computationally efficient and two-way, avoiding absolute look-up of users and their associated groups, especially once a test option has been assigned, since the test option may be returned by simply running the same hashing and indexing procedure at the analysis server rather than searching a database for the User ID and associated groups.

Figure 7:
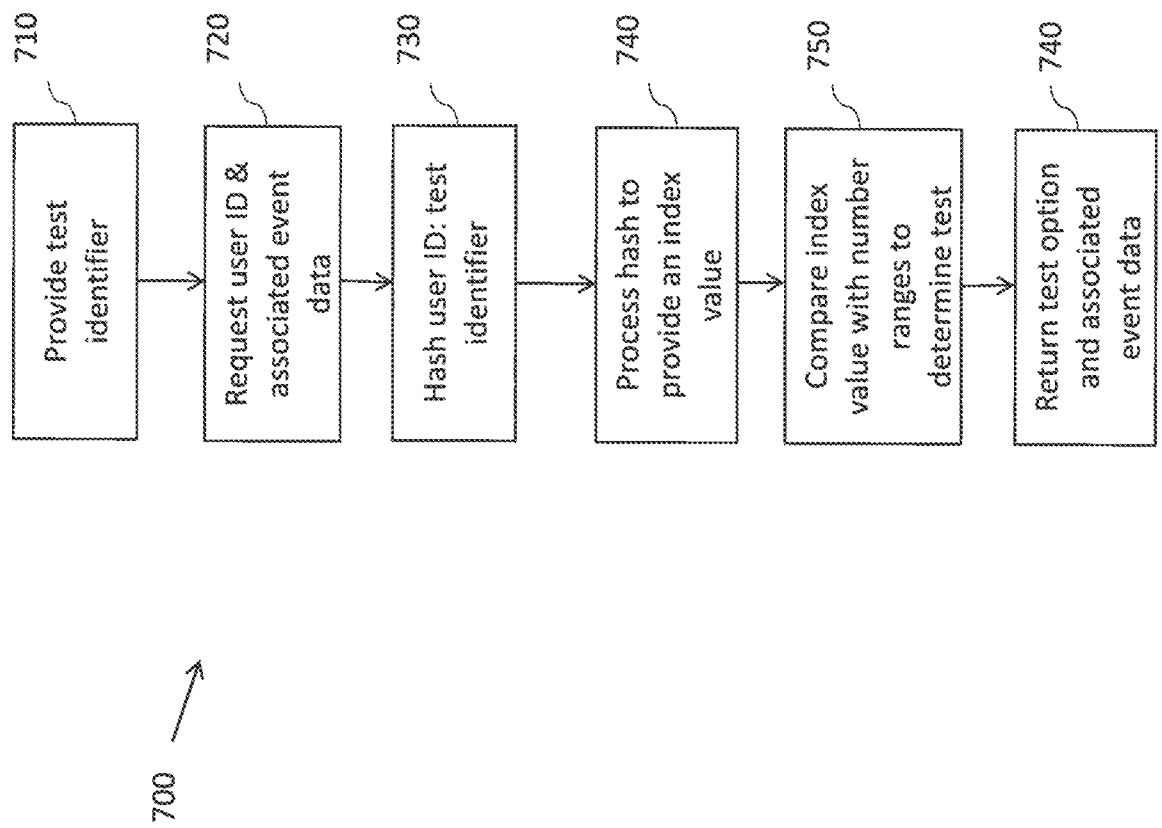
FIG. 7 is a flowchart illustrating steps in a method for analyzing which test options were provided.

The two-way nature of the scheme will now become apparent with reference to FIG. 7 which shows steps of an embodiment 700 carried out by way of example by the TAA at the analytics server 310. This may occur when an analyst makes a request to analyze a previous or ongoing test to produce results and a conclusion for the service provider 220. To do this, the analyst must know which test option and hence group a user whom participated in the test was allocated to.

The analytics server 310 provides a test identifier associated with an application (e.g. "testname1" as shown and described with reference to FIG. 4 previously) at step 710, and subsequently at step 720 requests User ID and associated event data, which is provided via the data structure 340 of FIG. 3.

At step 730 the analytics server performs the hashing operation HASH(UserID:test identifier) as previously described, such as a MD5 hashing operation. The result is subsequently processed, such as described with reference to FIG. 6, to provide an index value at step 740.

The analytics server then compares, at step 750 the computed index value with the number ranges associated with the test 400 and determines the test option that the user was provided with based on the range within which the index value or number falls.

Therefore, the group in that test to which the user belongs, being associated with the option is determined based on the index. The determined test option and associated event data is then provided to the analyst for subsequent analysis.

In an embodiment the data structure 400 describing the test options and probability ranges and groups therefore may be provided in the memory 320 or store of the analytics server 310, therefore improving processing and requiring database queries for only a user ID and event data associated with the application under test.

In another embodiment, there is provided a module for determining an index value indicating a test option in response to a provided user identifier and a test identifier by a computing device in communication therewith, the module being configured to generate a hash of the provided user identifier and test identifier, to process the hash to provide an index, and to return said index to said computing device.

In this embodiment, the generation of the hash may comprise performing an MD5 hashing operation to provide an integer.

In another embodiment, the module may be configured to perform a modulo operation on the integer to return or provide the index.

In a variation of the above embodiment, the modulo operation is a MOD(100) operation, with the last two bytes of the integer being used to determine an index value lying between 0-99.

The module may be provided with a network interface, which may be wired, wireless, cellular or optical to enable communication with a computing device itself configured to communicate with the module via appropriate or compatible API and network interfaces.

In some embodiments, the computing device may provide either, or both of the test identifier and user identifier to the module.

Hence, a system and algorithms or schemes are provided which allocate a user to a test option in a manner that enables the application server 220 to be decoupled from the analysis server 310 and hence avoids excessive queries and look-ups.

In addition, the anonymity of the users is preserved, whilst enabling queries which are analysed algorithmically in an efficient manner to reduce back end load and query time.

Other embodiments may comprise different modulo operations depending on the population size for example.

Since the embodiments above decouple the analysis process from the user device and application server, the data can be modified or updated as relevant events occur and requests from the analyst input without causing resource depletion.

A person skilled in the art will realise that the different approaches to implementing the systems, devices schemes and methods disclosed herein are not exhaustive, and what is described herein are certain preferred embodiments. It is possible to implement the way in a number of variations without departing from the spirit or scope of the invention.

The invention claimed is:

1. A computer system comprising:
an applications server for modifying according to a test option selected from multiple test options at least one user interface feature of an application under test for delivery to a user device;
an analytics server for analysing event data associated with the application under test; and
an event database storing a data structure storing at least one user identifier associated with a user, application data and event data associated with the user, said event data generated by the user executing the application modified by the selected test option of multiple test options; wherein the analytics server comprises
at least one processor configured in response to an analysis query comprising a user identifier to:
request a test identifier and associated application event data associated with that user,
combine a user identifier associated with that user, and the test identifier, to form a per-user-per-test identifier,
perform a hash on the per-user-per-test identifier to generate a hash of the per-user-per-test identifier,
process the hash to generate an index value,
compare said index value with a distribution of numbers divided into multiple ranges to determine within which range the index value falls, each range being associated with one of the test options,
indicate one of the test options associated with the range into which the index value falls, associate the indicated test option with the associated event data for analysis; and return the indicated test option and associated event data in response to the analysis query, wherein the indicated test option is the selected test option and wherein the application server is configured to modify the user interface feature of the application based on the selected test option prior to the application returning the event data based on the indicated test option.

2. A computer system according to claim 1, wherein the processor is configured to perform a hash by performing an MD5 hashing operation to provide an integer.

3. A computer system according to claim 2, wherein the processor is configured to process the hash to generate an index value by performing a modulus operation on said integer to provide said index value falling within the distribution of numbers divided into multiple ranges.

4. A computer system according to claim 1, wherein the application comprises a computer game.

5. A computer system according to claim 3, wherein the modulus operation is a modulus (100) operation.

6. A computer system according to claim 1, wherein the processor is further configured to analyse the event data associated with the selected test option.

7. A computer system according to claim 1, wherein the test options are associated with computer games and modify the user interface of said computer games.

8. A computer system according to claim 7, wherein the processor is further configured to perform an analysis of the event data associated with the selected test option, wherein the test options are comparative options for a user interface feature of a computer game, and wherein the analysis returns an indication of a preferred test option of the multiple test options.

9. A computer implemented method executed by a computer system comprising an applications server for modifying an application executable at a user device in accordance with a selected test option of multiple test options and an analytics server for analysing event data associated with an application under test to identify the test option used to modify the application, the method comprising executing computer readable instructions by one or more computer processor to perform the steps of:

modifying a user interface feature of an application executable at a user device in accordance with a test option of multiple test options;

storing in an event database event data generated from executing the modified application, the event database storing a data structure storing at least one user identifier associated with a user, application data and event data associated with the user, said event data generated by the user executing the application modified by the selected test option of multiple test options;

requesting the event data generated from executing the modified application associated with a user identifier, and a test identifier of a test having more than one test option associated therewith, combining the user identifier associated with a user, and the test identifier, to form a per-user-per-test identifier, performing a hash on the per-user-per-test identifier to generate a hash of the per-user-per-test identifier, processing the hash to generate an index value, comparing said index value with a distribution of numbers divided into multiple ranges, each range being associated with one of the test options, and indicating the one of the test options associated with the range into which the index value falls, to associate the event data with the indicated test option for analysis;

wherein the indicated test option is the selected test option and modifying the user interface feature of the application based on the selected test option is performed prior to the application returning the event data based on the indicated test option.

10. A computer implemented method according to claim 9, wherein the step of performing a hash comprises performing an MD5 hashing operation to provide an integer.

11. A computer implemented method according to claim 10, wherein the processing of the hash to generate an index value comprises performing a modulus operation on said integer.

12. A computer implemented method according to claim 11, wherein the modulus operation is a modulus (100) operation to provide an index value falling within said distribution of numbers.

13. A computer implemented method according to claim 9, wherein the step of requesting event data comprises requesting event data from the event database which holds a data structure stored in electronic memory, the data structure containing predefined tests indicated by respective test identifiers in association with said event data, wherein the users are not associated with their test options in the event database.

14. A computer implemented method for modifying a computer executable application delivered by an application server to a population of users, the method comprising:

allocating one of multiple test options for a test for the application, the allocated test option modifying the application prior to delivery to the population of users by carrying out a sequence of steps at the application server to select a test option for the test, the steps comprising:

(a) selecting a test associated with the requested application, (b) combining a user identifier associated with a user at a user device configured to execute the application, and the test identifier associated with the selected test, to form a per-user-per-test identifier, (c) performing a hash on the per-user-per-test identifier to generate a hash of the per-user-per-test identifier, (d) processing the hash to generate an index value, (e) comparing said index value with a distribution of numbers divided into multiple ranges, each range being associated with a test option, and (f) selecting a test option associated with the range into which the index value falls, the method further comprising storing in an event database event data generated from executing the modified application, the event database storing a data structure storing at least one user identifier associated with a user, application data and event data associated with the user, said event data generated by the user executing the application modified by the selected test option of multiple test options; and determining which test option was allocated at an analytics server remote from the application server, the analytics server being configured to analyse event data associated with the application under test by executing the same sequence of steps (a) to (f) for determining which test option was allocated for analysing event data, wherein the application server and the analytic server do not share data defining the allocated test options, wherein modifying the user interface feature of the application based on the selected test option is performed prior to the application returning the event data based on the determined test option.

15. A computer implemented method according to claim 14, comprising the step of analysing the event data associated with the selected test option.

16. A computer implemented method according to claim 14, comprising the step of requesting the event data from an events database in which users are not associated with their allocated test options.

* * * * *